May 8, 1951          F. M. McBETH          2,552,441

FOOD COOKING APPARATUS

Filed April 28, 1945          2 Sheets-Sheet 1

Inventor
FREEMAN M. McBETH

Attorney

May 8, 1951 F. M. McBETH 2,552,441
FOOD COOKING APPARATUS
Filed April 28, 1945 2 Sheets-Sheet 2
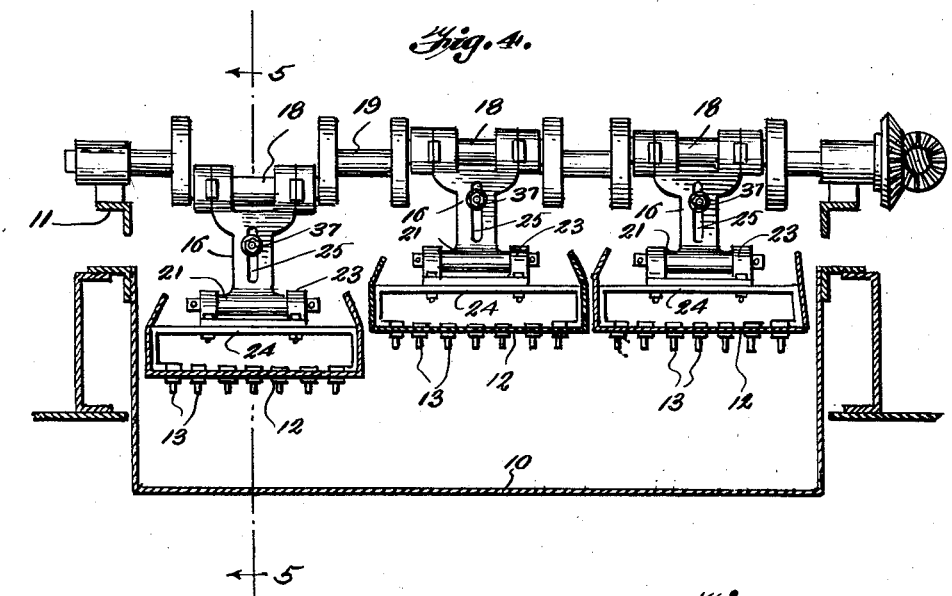
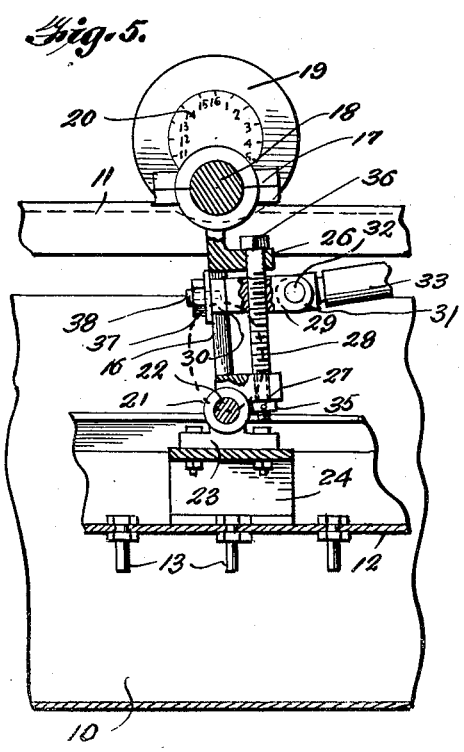
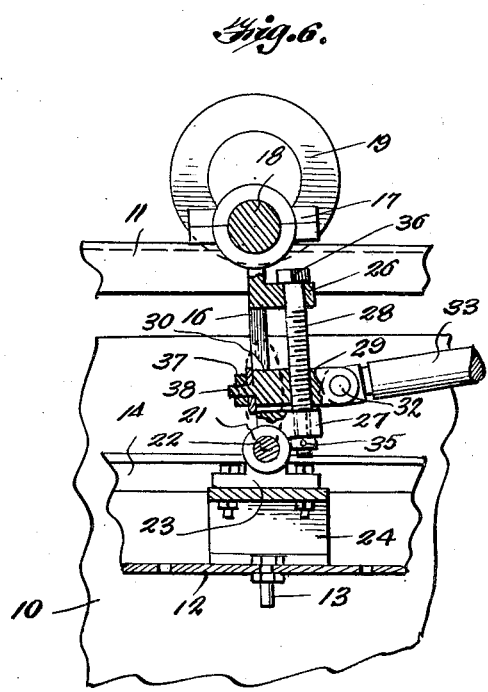
Inventor
FREEMAN M. McBETH Patented May 8, 1951

2,552,441

UNITED STATES PATENT OFFICE 2,552,441

FOOD COOKING APPARATUS

Freeman M. McBeth, Harrisburg, Pa., assignor to Macbeth Engineering Corporation, a corporation of Pennsylvania Application April 28, 1945, Serial No. 590,750

5 Claims. (Cl. 99—405)

This invention relates to apparatus for cooking articles of food by immersion in a bath of cooking liquid. In apparatus of this type it is customary to provide the cooking kettle with impellers which move the food articles longitudinally through the kettle and subject them to intermittent advancements and immersions in the cooking liquid. In practice, the bath of cooking liquid is maintained at a higher temperature over its inlet portion than over its outlet portion, as disclosed in Patent No. 2,174,555 of October 3, 1939, to Joseph D. Ferry. It is desirable that articles being cooked be subjected to the higher temperature longer than to the lower temperature. Where impeller movement is uniform throughout the cooking kettle the rate of progress of food particles is substantially the same throughout, and the particles are, in consequence, held in the zone of lower temperature longer than is desirable.

An important object of the present invention is to provide in such apparatus an improved arrangement and construction of impeller mechanism whereby food particles are caused to move more rapidly through the zone of lower temperature than the higher, without variation in the rate of drive of the impeller operating means.

Another object is to provide an improved means for adjusting a plurality of impellers relative to one another whereby to regulate the passage of food particles through the cooking liquid.

Other objects and advantages will be apparent from the following description.

Although the present disclosure relates to an apparatus for frying potato chips, it is not limited to such use.

In the accompanying drawings, wherein like reference characters denote like parts throughout the several views:

Figure 1 is a top plan view of a cooking kettle provided with impellers in accordance with the invention.

Figure 2 is a longitudinal section therethrough.

Figure 3 is an enlarged fragmentary elevation of a portion of the impeller mechanism, with parts broken away for illustration of details.

Figure 4 is a section taken on the line 4—4 of Figure 3.

Figure 5 is a section taken on the line 5—5 of Figure 4.

Figure 6 is a section similar to Figure 5 but with the impeller adjusting means in another position of adjustment.

In the disclosed embodiment of the invention, the cooking kettle 10 has associated therewith a removable top frame 11 which mounts the impeller mechanism and its operating means. Each impeller comprises a perforated, flat, rectangular plate 12 elongated longitudinally of the kettle and provided with a plurality of depending tines 13. The plate 12 is long and narrow and is provided with upstanding parallel side edge flanges having inwardly inclined top portions 14, and with upwardly and inwardly directed end edge flanges 15 which prevent passage of food particles over the top face of the impeller plate.

The impellers are arranged as two batteries A and B of three each, with the impellers of each battery disposed in close parallel relation. It will be understood that the number may be greater or less as desired. In this embodiment the inlet end of the kettle is at the right in Figures 1 and 2 and the outlet end at the left. The tines 13 of the impeller battery A at the inlet end are shorter than the tines 13 of the battery B at the outlet end, as shown in Figure 2. The impellers of the two batteries are arranged as longitudinally disposed series of pairs, with their adjacent ends in close proximity.

Each impeller is suspended within the kettle by means of a pair of longitudinally spaced connecting rods 16 connected at their upper ends by bearing sleeves 17 to cranks 18 on crank shafts 19 which extend transversely across the top of the kettle and are driven by suitable gearing connection from the drive shaft D operated by appropriate power means, not shown. Indicia 20 are provided on the crank shafts to determine a required setting so that a series of impellers may be relatively adjusted for operation in a determined sequence. The lower end of each connecting rod 16 has a sleeve bearing connection 21 with a wrist pin 22 disposed parallel to the crank shaft and supported in journals 23 carried by a bracket 24 suitably secured to the plate 12 between the side walls thereof.

One connecting rod of each impeller has a flattened central shank portion provided with a closed end slot 25, and is further provided on one face with a pair of integral laterally directed lugs 26 and 27 disposed, respectively, at the ends of the slot. The lugs 26 and 27 mount a non-traveling bolt stem 28 arranged for rotation in the supporting lugs. The stem 28 has threaded engagement with a traveling nut comprising a clevis 29 formed with an integral guide lug 30 that extends into and rides in the slot 25. The yoke arms 31 of the clevis have pivotal connection through a pivot pin 32 with one end of a tie rod or link 33 which has pivotal connection at its other end with a transversely disposed shaft 34 fixed in the top frame 11 between the crank shafts 19. The tie rod is thus mounted to swing through a vertical arc from its pivot on the fixed shaft 34.

The adjusting bolt 28 is retained in position in the lugs 26 and 27 by means of a cotter pin and nut assembly 35 on its lower end which projects beneath the bottom lug 27. The head 36 of the bolt projects above the top lug 26 and is shaped for operating engagement by a suitable tool, such as a wrench, whereby the bolt may be rotated to move the clevis either up or down along the shank of the connecting rod according to the direction of rotation of the bolt. When the clevis is in its uppermost position of adjustment, as shown in Figure 5, the horizontal minor axis of the elliptical orbit of the wrist pin 22 will be at its maximum, whereby maximum raking action of the impeller tines is obtained. When the clevis is at its lowermost position, as shown in Figure 6, the horizontal minor axis of the elliptical orbit of the wrist pin will be at its minimum, with consequent minimum raking action of the impeller. Various positions of adjustment between the upper and lower limits will effect corresponding differences in the horizontal extent of the raking action of the impeller. A nut 37 threaded on an extension 38 of the clevis guide lug 39 provides a means for locking the assembly in positions of adjustment.

In the embodiment of the invention herein disclosed, the crank shafts are driven counterclockwise, whereby the impellers will be caused to move in vertical elliptical orbits during which their tines will intermittently engage the food particles in the cooking liquid beneath the impellers and advance them from inlet to outlet. The minor horizontal axis of the elliptical orbit will be advanced toward the outlet end of the kettle.

I claim:

1. In a cooking apparatus, a container for the reception of a cooking liquid, means for moving food particles therethrough comprising impellers arranged in series longitudinally of the container from inlet to outlet, the temperature of the cooking liquid being higher at the inlet portion of the container than at the outlet portion, means for moving said impellers in vertical elliptical paths, depending tines on said impellers to intermittently dip into the cooking liquid and engage the food particles for advancing the particles therethrough, and the horizontal stroke of the impellers in the inlet portion of said container being shorter than the horizontal stroke of the impellers in the outlet portion.

2. In a cooking apparatus, a container for the reception of a cooking liquid, means for moving food particles therethrough comprising a plurality of impellers arranged in series longitudinally of the container, means for operating all said impellers in elliptical paths at the same rate of speed, means for varying the horizontal minor axis of the elliptical path of movement of one impeller relative to another in the series, and each of said impellers having a plurality of depending tines to dip into the cooking liquid and engage the food particles for advancing the particles therethrough.

3. In a cooking apparatus, a container for the reception of cooking liquid and having an inlet portion and an outlet portion, a battery of impellers in the inlet portion, a battery of impellers in the outlet portion and aligned with the first-named impellers longitudinally of the container, a plurality of depending tines on each impeller, means for moving said impellers at the same rate of speed in vertical elliptical paths whereby to cause the tines to intermittently dip into the cooksaid primary cooking zone above the foodstuffs, an impeller in said secondary cooking zone above the foodstuffs, said impellers being arranged in series longitudinally of the container, and means connected to each impeller for intermittently moving the same into engagement with the foodstuffs and to impart to each impeller a substantially horizontal stroke whereby the foodstuffs are intermittently immersed and advanced in the cooking bath, the horizontal stroke imparted to the impeller in the primary cooking zone being shorter than that imparted to the impeller in the secondary cooking zone.

FREEMAN M. McBETH.

REFERENCES CITED

The following references are of record in the file of this patent:

UNITED STATES PATENTS

| Number | Name | Date |
|---|---|---|
| 1,599,916 | Nye | Sept. 14, 1926 |
| 2,085,494 | Ferry | June 29, 1937 |
| 2,130,082 | Ferry | Sept. 13, 1938 |
| 2,174,555 | Ferry | Oct. 3, 1939 |
| 2,176,624 | Ferry | Oct. 17, 1939 |